June 26, 1962 T. H. BONN ET AL 3,041,468

SIGNAL TRANSLATING DEVICE

Original Filed Sept. 24, 1953 9 Sheets-Sheet 1

INVENTORS
JOHN PRESPER ECKERT, Jr.
THEODORE H. BONN
BY
Sheldon Kapnik [signature]
ATTORNEY June 26, 1962 T. H. BONN ET AL 3,041,468

SIGNAL TRANSLATING DEVICE

Original Filed Sept. 24, 1953 9 Sheets-Sheet 2

INVENTORS
JOHN PRESPER ECKERT, JR.
THEODORE H. BONN

BY Sheldon Kapustin

ATTORNEY

SIGNAL TRANSLATING DEVICE
Original Filed Sept. 24, 1953 9 Sheets-Sheet 3
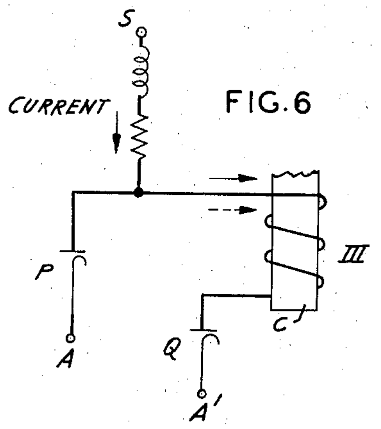
FIG. 6
FIG. 6a
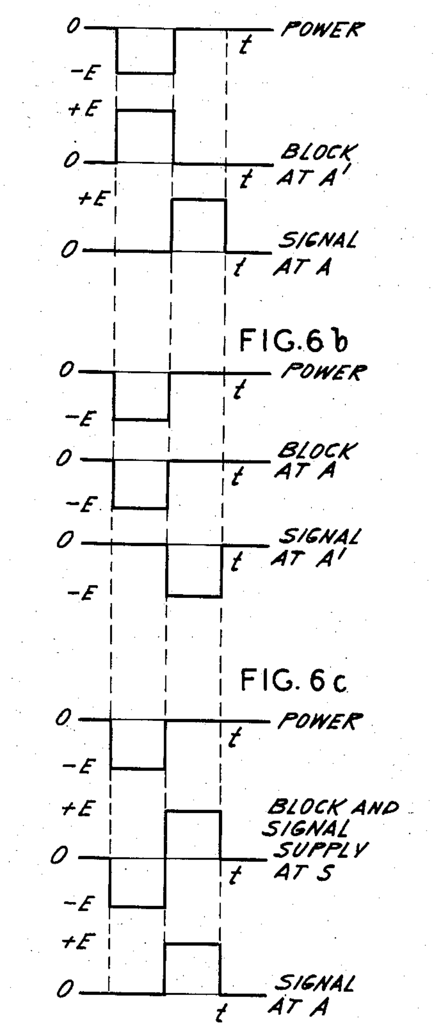
FIG. 6b, FIG. 6c
FIG. 7
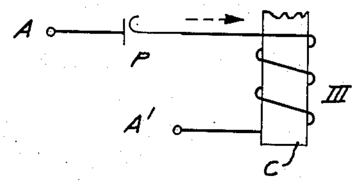
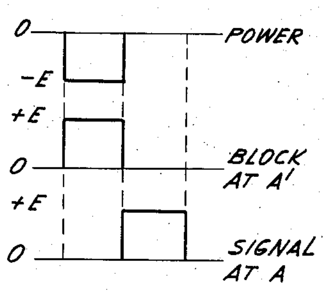
FIG. 7a
INVENTORS
JOHN PRESPER ECKERT, JR.
THEODORE H. BONN
BY
[signature]
ATTORNEY INVENTORS
JOHN PRESPER ECKERT, JR
THEODORE H. BONN
BY
Sheldon Kapustin
ATTORNEY

INVENTORS
JOHN PRESPER ECKERT, JR.
THEODORE H. BONN
BY
ATTORNEY

INVENTORS
JOHN PRESPER ECKERT, JR.
THEODORE H. BONN
BY
[signature]
ATTORNEY

June 26, 1962 T. H. BONN ET AL 3,041,468

SIGNAL TRANSLATING DEVICE

Original Filed Sept. 24, 1953 9 Sheets-Sheet 7

INVENTORS
JOHN PRESPER ECKERT, JR.
THEODORE H. BONN
BY
Sheldon Kapusta
ATTORNEY

SIGNAL TRANSLATING DEVICE

Original Filed Sept. 24, 1953 9 Sheets-Sheet 8

INVENTORS
JOHN PRESPER ECKERT, JR.
THEODORE H. BONN
BY
ATTORNEY

INVENTORS
JOHN PRESPER ECKERT, JR.
THEODORE H. BONN
BY
ATTORNEY

United States Patent Office 3,041,468

Patented June 26, 1962

3,041,468

SIGNAL TRANSLATING DEVICE

Theodore H. Bonn, Merion Station, and John Presper Eckert, Jr., Gladwyne, Pa., assignors, by mesne assignments, to Sperry Rand Corporation, New York, N.Y., a corporation of Delaware Original application Sept. 24, 1953, Ser. No. 382,180. Divided and this application June 25, 1959, Ser. No. 822,943

24 Claims. (Cl. 307—88)

This application is a division of our copending application Serial Number 382,180, filed September 24, 1953, now Patent No. 2,892,998.

The invention disclosed herein relates to bistable devices and is particularly concerned with such devices in the nature of flip-flops utilizing magnetic amplifiers.

As is well-known, one of the basic components used in computing machines is the bistable device known as a flip-flop. Such devices may be conveniently used for the storage of binary information (i.e. a "1" or "0" bit) and are more generally employed to store either the occurrence of a first or second condition, wherein the indicia of the condition to be stored by the flip-flop is transitory. Flip-flops are said to have two stable states; one indicating the occurrence of the first condition and the other indicating the presence of the second condition. It should be noted that once the flip-flop indicates a given condition (e.g. the presence of a "1" bit), a future occurrence of the same condition will have no effect on the flip-flop. Only the occurrence of the other condition (e.g. the presence of a "0" bit) will cause the flip-flop to change state.

In the past, such bistable devices have normally been constructed in the form of vacuum tube circuitry, and while such circuitry is usually acceptable, it does have several disadvantages. First, the use of vacuum tubes results in a circuit unit which is relatively large in size, thereby making disposition of components within an overall installation rather difficult. Second, vacuum tubes are subject to breakage and as a result circuits utilizing such vacuum tubes are often relatively fragile. Again, in the normal course of operation vacuum tubes are subject to normal operating failures, thus raising serious questions of maintenance and the cost attendant thereto.

In order to reduce failures due to the foregoing difficulties, other forms of electrical devices have been suggested for use in bistable circuits. One such other form is the magnetic amplifier and it is with this particular type of bistable device that the present invention is primarily concerned.

Several flip-flop circuits employing magnetic amplifiers are shown and described in the body of this specification. Generally, each of the flip-flops shown comprises two magnetic amplifiers; these amplifiers can either be connected in cascade to form a chain, or in parallel as explained below. Further, as one embodiment of this invention illustrates, a passive element may be substituted for one of the magnetic amplifiers so that the flip-flop will comprise only one magnetic amplifier. However, in each of the flip-flops described herein, two inputs are provided therefor labelled "set" and "restore." The presence or absence of a potential at the output of the flip-flop indicates to which of the two inputs a signal, indicative of the occurrence of a condition, was last applied.

As disclosed in our parent application, amplifiers of the type utilized here in the flip-flop circuits may employ ferromagnetic materials. Such materials may exhibit a hysteresis loop and in conjunction with a coil of wire display a high impedance when operating over the portion of the loop from minus residual flux density to plus residual flux density and show a low impedance when travelling from plus residual flux density towards plus saturation flux density. Use can be made of these effects for signal translating and amplifying purposes. A way of using this effect is to produce the desired output when and while the core occupies the high impedance portion of its hysteresis loop. The present invention covers devices, particularly flip-flops, employing magnetic amplifiers exhibiting this effect. These amplifiers may be conveniently referred to as parallel signal translating or employing devices.

Accordingly, it is an object of this invention to provide a new magnetic apparatus.

Another object of this invention is to provide a novel combination of magnetic amplifiers to form a bistable device.

Another object of this invention is to provide a novel combination of a magnetic amplifier and a delay element to form a bistable device.

Another object of this invention is to provide a new signal translating apparatus to be used as a flip-flop.

Another object of this invention results in the provision of a bistable device utilizing magnetic amplifiers as a basic component thereof.

Yet another object of this invention results in the provision of a bistable device which is both inexpensive to construct and which exhibits considerable ruggedness.

Other objects and advantages of the invention will become apparent from the following description and the accompanying drawings, in which.

Figure 2A:
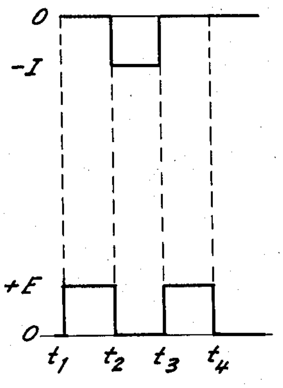
FIGURE 2 shows a basic circuit of a solid-state signal translating device.
Figure 2:
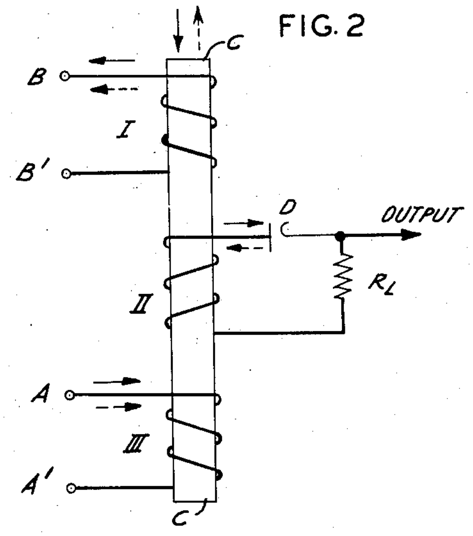
Figure 3:
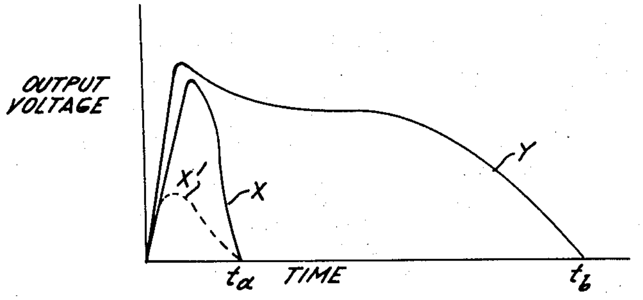
Figure 4:
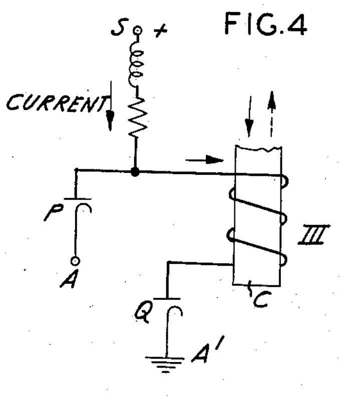
Figure 5:
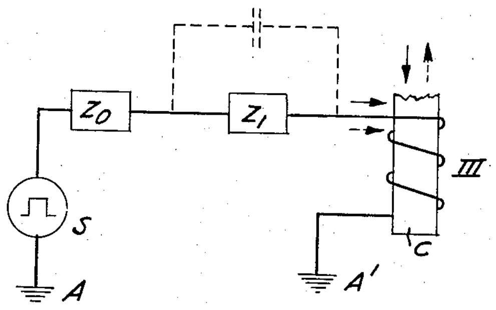
Figure 10:
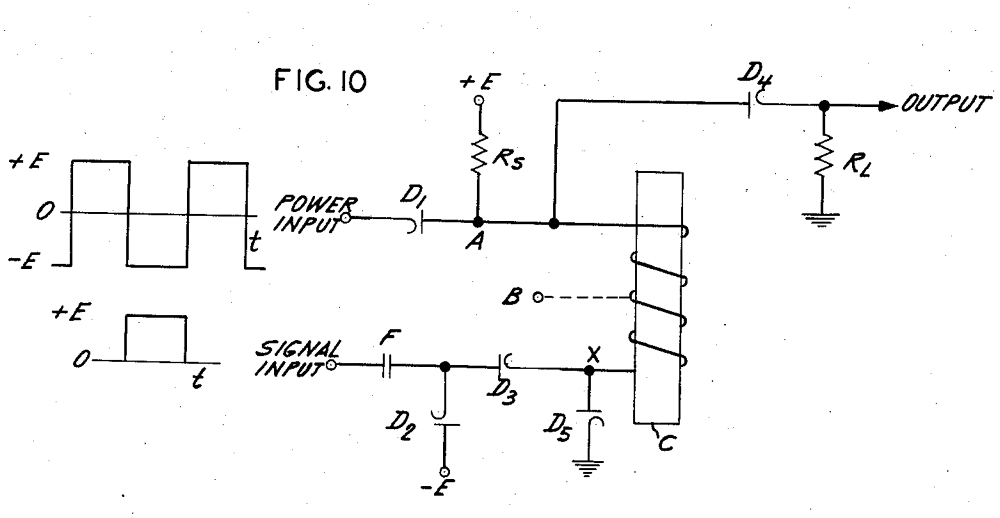
Figure 8:
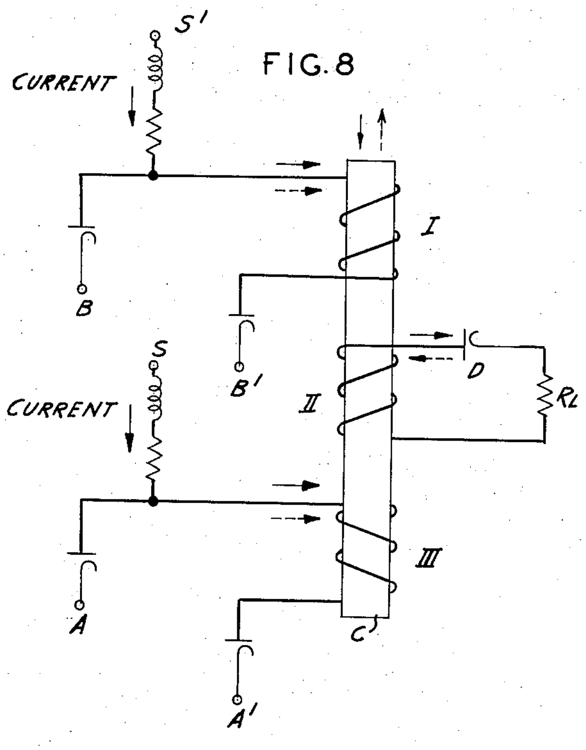
Figure 8A:
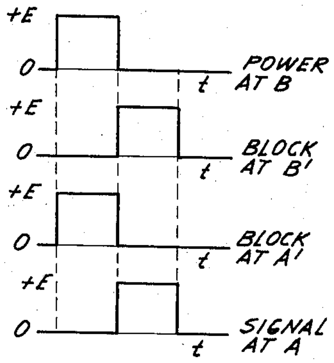
Figure 9:
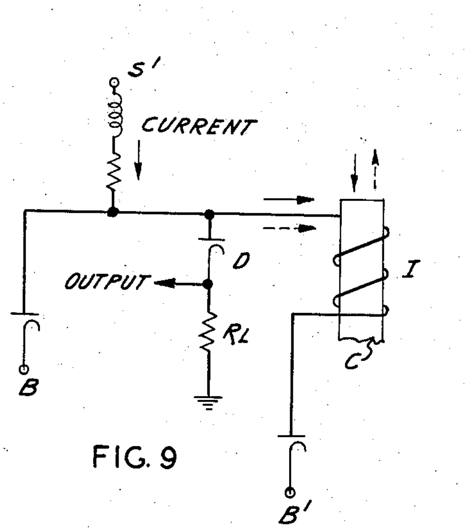
Figure 9A:
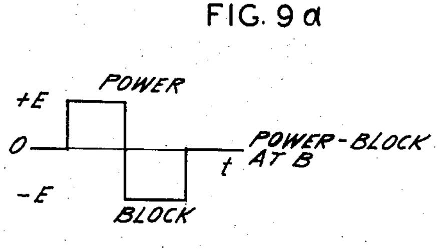
Figure 11:
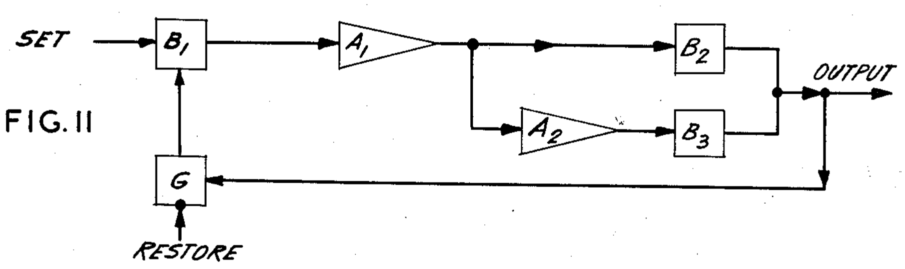
Figure 11A:
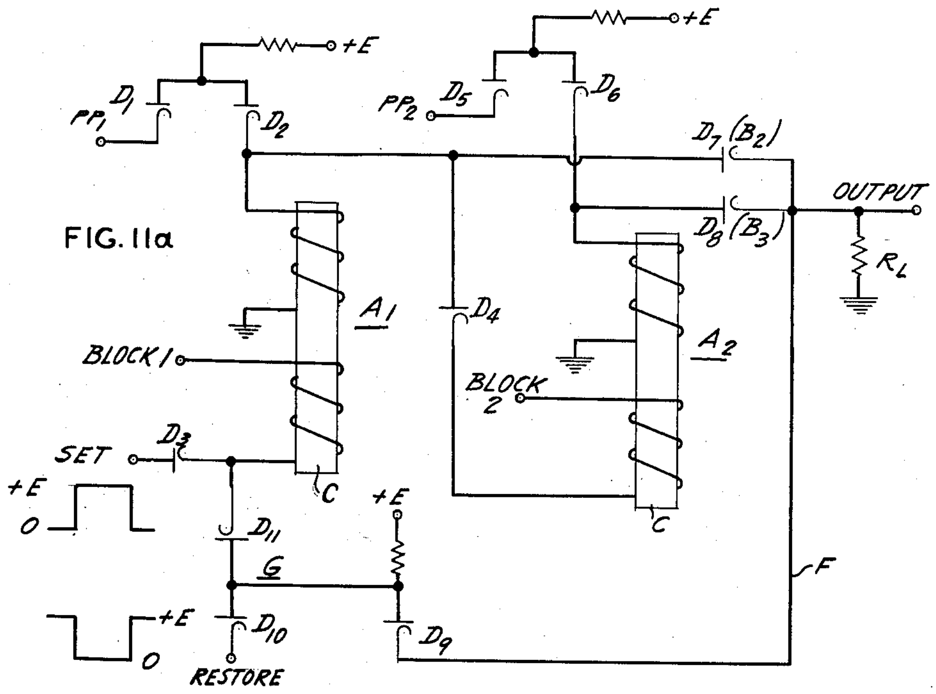
Figure 11B:
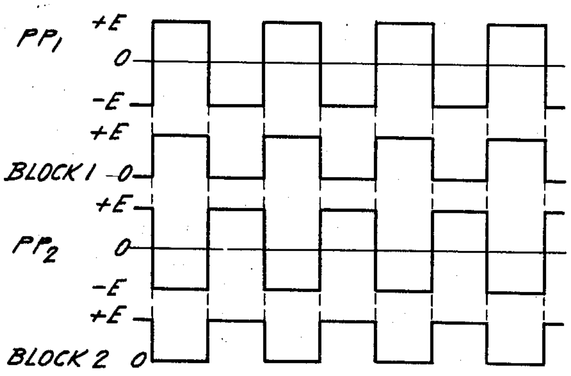
Figure 11C:
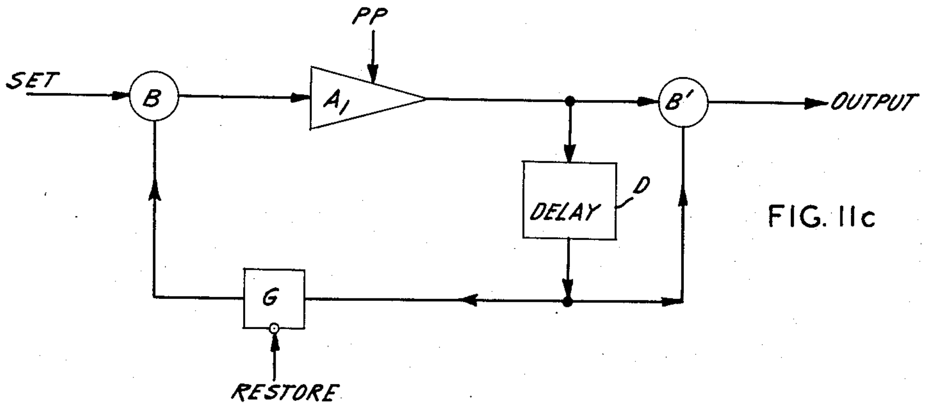
Figure 11D:
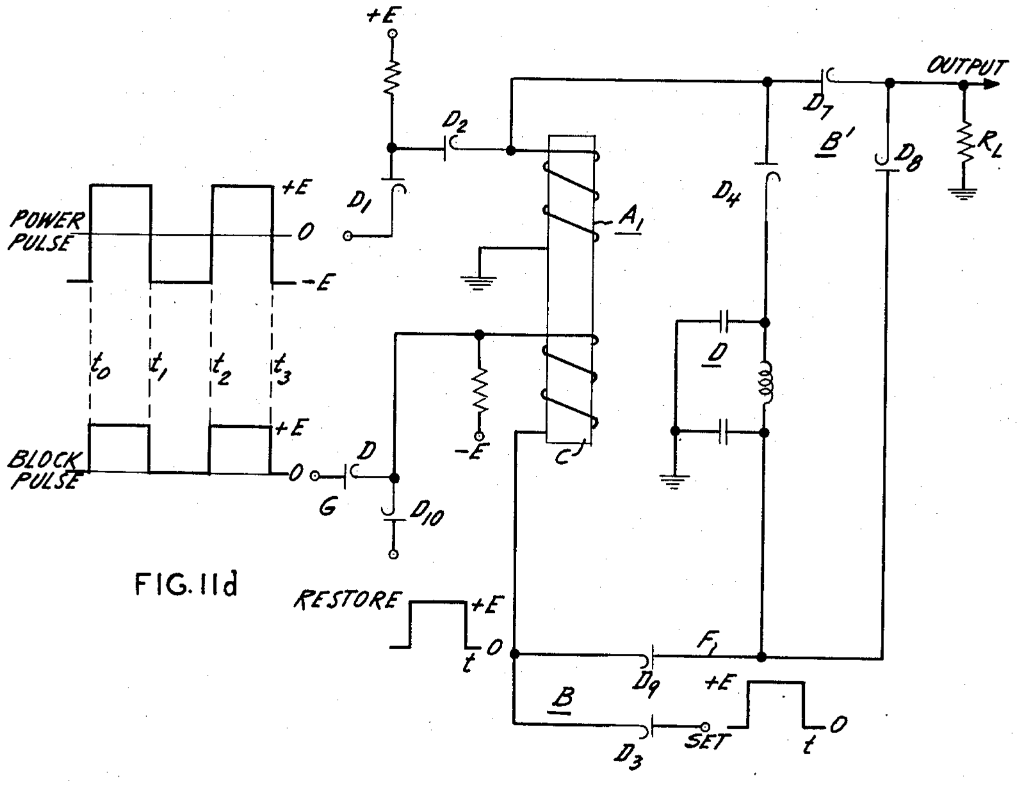
Figure 11E:
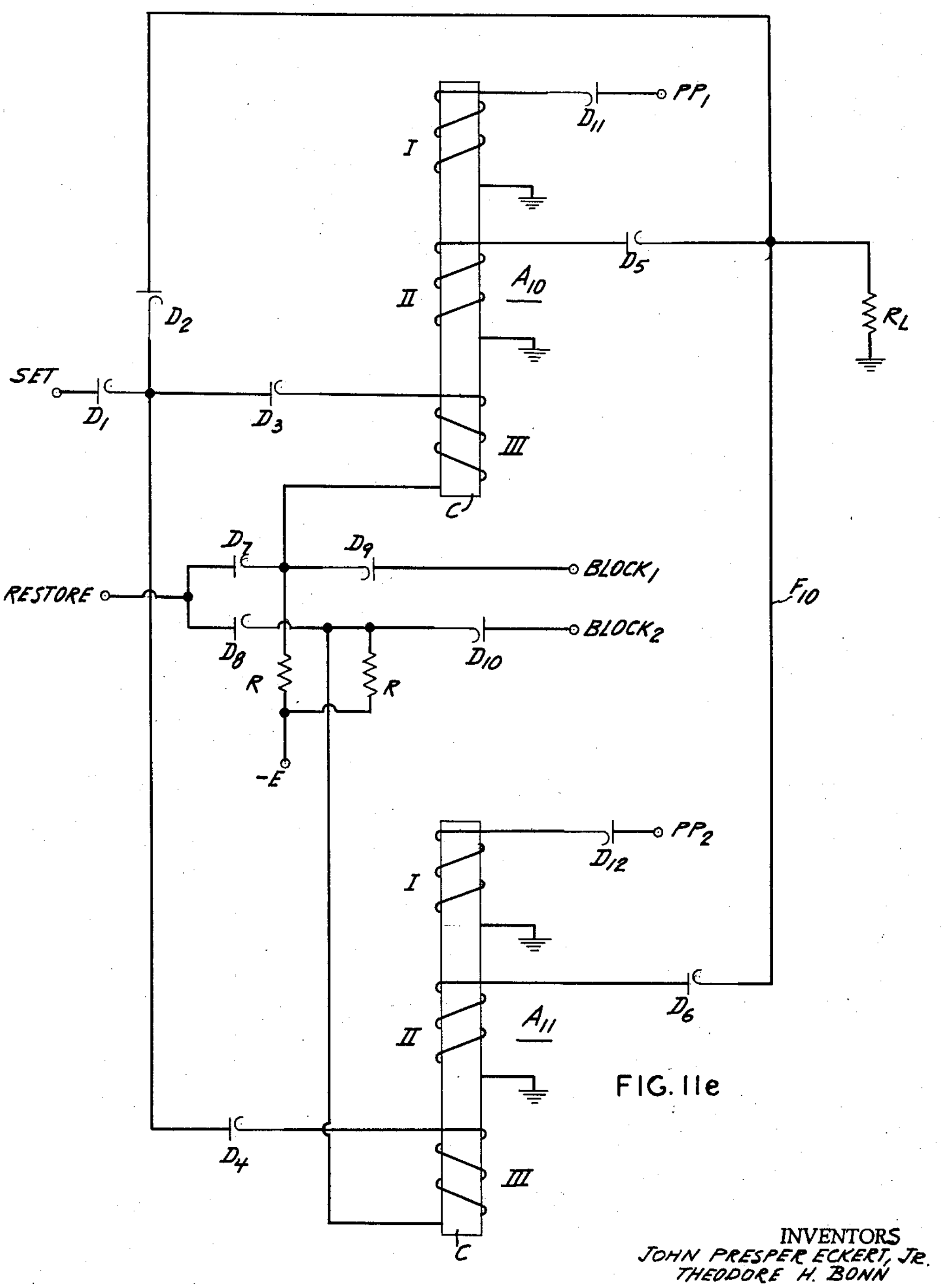
Figure 11F:
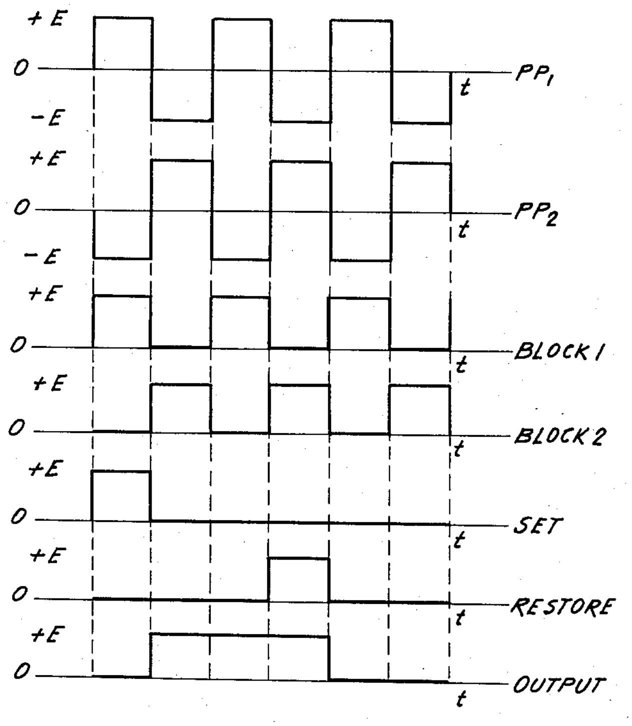
Figure 11H:
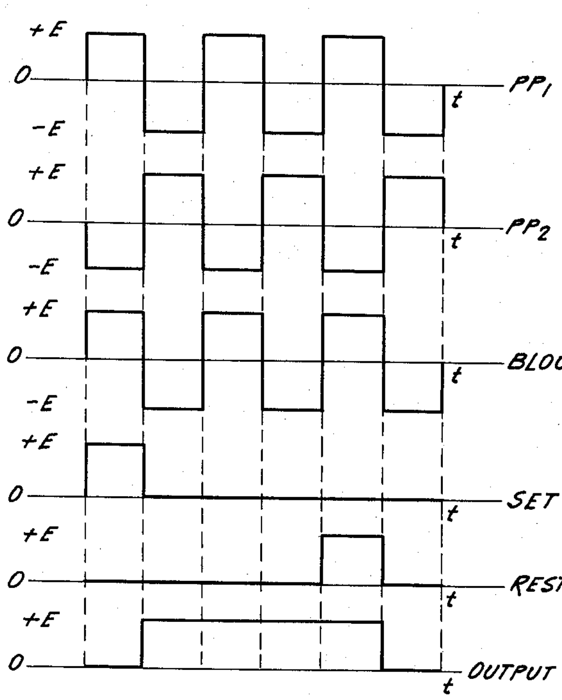
Figure 11G:
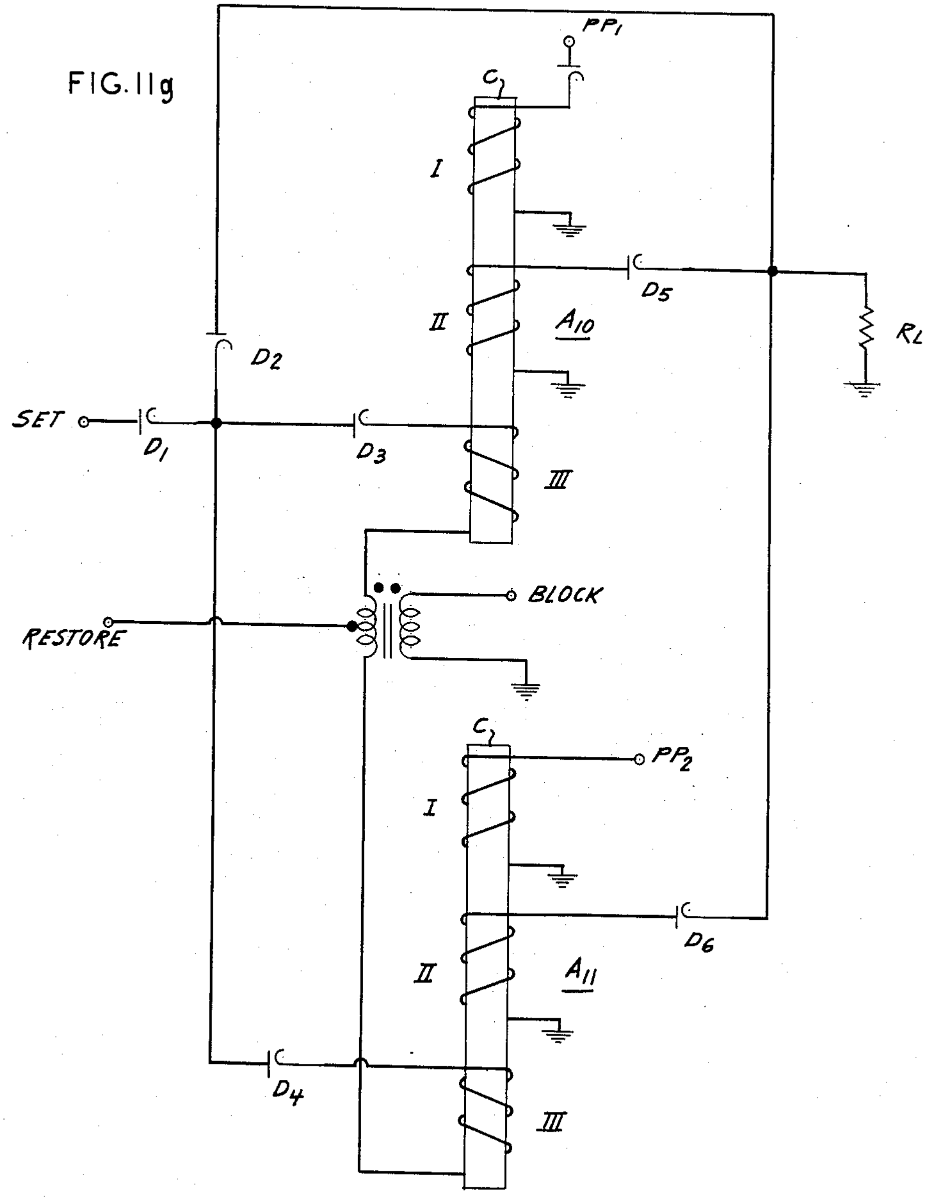

FIGURE 2*a* illustrates the operating time cycle for the embodiment of FIGURE 2;

FIGURE 3 illustrates some representative output wave forms;

FIGURE 4 shows an input winding with a constant current input;

FIGURE 5 shows an input winding with a constant voltage input;

FIGURE 6 shows an input winding to be used in connection with the application of a constant current and the use of diodes and blocking pulses;

FIGURE 6*a* represents a first operating time cycle for the circuit of FIGURE 6;

FIGURE 6*b* represents a second operating time cycle for the circuit of FIGURE 6;

FIGURE 6*c* represents a third operating time cycle for the circuit of FIGURE 6;

FIGURE 7 illustrates an input winding to be used in connection with the application of a constant voltage;

FIGURE 7*a* shows the form of pulses to be applied to the circuits of FIGURE 7;

FIGURE 8 illustrates the three windings of a magnetic signal translating device to which D.C. power may be applied;

FIGURE 8*a* shows the pulse forms to be used in connection with the arrangement of FIGURE 8;

FIGURE 9 illustrates an arrangement in which the output is directly connected to the power winding;

FIGURE 9*a* shows a wave form which serves both as a power pulse and as a blocking pulse;

FIGURE 10 exemplifies the circuits of a single coil magnetic signal translating device;

FIGURE 11 gives a block diagram of a first signal translating system to be used for flip-flop effects;

FIGURE 11*a* represents the schematic diagram for the circuit of FIGURE 11;

FIGURE 11*b* illustrates the power waves and blocking pulses to be applied to the circuit of FIGURE 11*a*;

FIGURE 11*c* gives a block diagram of a second signal translating system to be used for flip-flop effects;

FIGURE 11*d* represents the schematic diagram for the circuit of FIGURE 11*c*;

FIGURE 11*e* shows a third flip-flop arrangement in schematic form;

FIGURE 11*f* illustrates the power waves and the blocking pulses to be applied to the circuit of FIGURE 11*e*;

FIGURE 11*g* shows a fourth flip-flop arrangement in schematic form; and

FIGURE 11*h* illustrates the power waves and blocking pulses to be applied to the circuit of FIGURE 11*g*.

It is to be understood that the invention is not limited to any specific geometries of the cores nor to any specific materials therefor, and that the examples given are illustrative only. The only requisite is that the material possesses a hysteresis loop preferably approaching the idealized hysteresis loop as shown in FIGURE 1.

Before describing the signal translating devices, the terms to be used in regard to different kinds of electric pulses will be defined. There are clock pulses and signal pulses. The signal pulses carry information and are, therefore, selectively applied. It depends upon the information to be transmitted whether such pulses are present or not. The clock pulses are automatically applied and do not carry any information. They may be subdivided into power pulses and blocking pulses. The power pulses usually supply the power for the operation of the signal translating device or, at least, open a gate to permit another source to operate the signal translating device. The blocking pulses block the interference of the power pulse with the signal input circuit and/or of the signal input circuit with the power circuit.

FIGURE 2 illustrates the basic arrangement of parts of a solid-state magnetic signal translating device. Part C is a core of ferromagnetic material. Winding I is the power winding, winding II is the output winding and winding III is the input winding. Power pulses are applied to winding I at, for example, terminal B. The solid arrow at terminal B indicates the direction of current of the power pulse. The solid arrow above core C indicates the direction of flux that this current causes in core C. A typical shape of the power pulse versus time is shown in the wave form of FIGURE 2*a* to the left of terminal B. This power pulse causes a current to flow in the load resistor $R_L$ in the direction shown by the solid arrow near winding II. The power pulse also causes a current to flow in winding III in the direction of the dotted arrow shown at terminal A. When a signal pulse is applied to terminal A of the signal winding, a current is made to flow in the signal winding in the direction of the solid arrow shown near terminal A. The wave form of FIGURE 2*a* to the left of terminal A is a typical wave form which might be applied to terminal A. The vertical lines connecting the wave forms of FIGURE 2*a* indicate the time relationship between the signal input pulse, which may or may not be present at terminal A, and the power pulse which occurs at terminal B.

Figure 1:
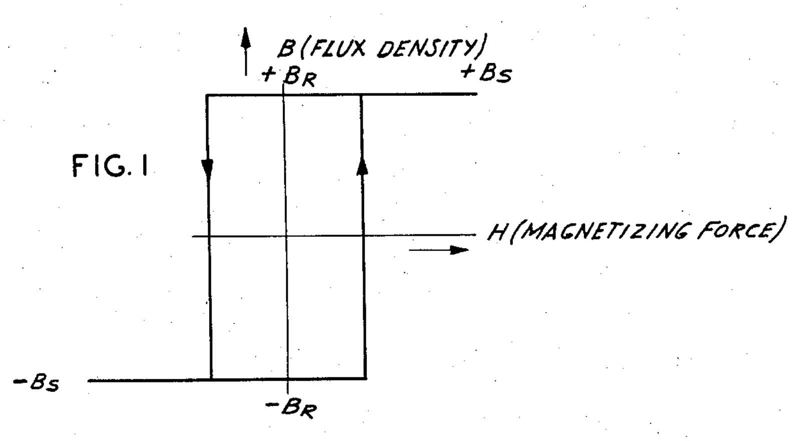
FIGURE 1 is a diagram of an idealized hysteresis loop.

The idealized BH loop of FIGURE 1 is a convenient means for describing the method of operation of the signal translating device. First, it will be assumed that there are no information pulses and that the power pulse is in such a direction as to drive core C from plus $B_R$ to plus $B_S$. In this event, there is a small flux change in the core, and hence an output voltage will be generated which, as a rule, is short in duration and, in the case of some materials, also small in amplitude (sneak pulse).

FIGURE 3 shows representative output wave forms. Wave forms X and $X^1$ are the types which would occur in the case just discussed, namely in the absence of an information pulse preceding the power pulse. The exact size and shape of these wave forms is determined by a number of factors, for example, the slope of the BH loop between $B_R$ and $B_S$, the amplitude and wave shape of the power pulse, the value of the load resistance, the power circuit inductance, eddy current phenomena in the core, distributed capacitances of the winding, etc.

Now, however, it will be assumed that an information pulse has occurred preceding the power pulse. When the preceding power pulse returned to 0, it left the core in the plus $B_R$ position. The information pulse causes the material to travel from plus $B_R$ to minus $B_R$ in a counterclockwise direction around the hysteresis loop. There is a large change of flux. Any currents which tend to flow in circuit II, the load circuit, are blocked by the diode D. Therefore, the only power which must be supplied from the information pulse is that power required to move the core from plus $B_R$ to minus $B_R$ and the power transferred to circuit I, the power circuit. Effective means have been found to block power transfer to the power circuit, as will be explained hereinafter. Therefore, the only power consumed from the signal input circuit is the power absorbed by the core in moving from plus $B_R$ to minus $B_R$ in the given time. After the period of time allotted to the signal pulse, the power pulse occurs and the core now starts from minus $B_R$ and proceeds to plus $B_R$. The core undergoes a large flux change and a large voltage is induced in winding II.

Curve Y, FIGURE 3, shows a representative output voltage versus time curve obtained when the material is operated between minus $B_R$ and plus $B_R$. The length of the output signal approximately equals the duration of the power pulse. Note that the current induced, which is in the direction of the solid arrow at winding II, FIGURE 2, is in the direction which will pass through the diode D.

The power delivered to the load may be many times larger than the power required of the information pulse. A net power gain is, therefore, obtainable in the signal translating device. Many factors influence the amount of power obtained. One of the most important factors, however, has to do with the extent to which the unwanted pulse known as the sneak pulse and shown at X or $X^1$ in FIGURE 3, may be tolerated in any practical situation. Another important factor is represented by the ratio of the slope on the steep portion of the hysteresis loop between plus $B_R$ and minus $B_R$ to the slope of the flat portion of the hysteresis loop between plus $B_R$ and plus $B_S$. A material with a rectangular hysteresis loop is desirable for this signal translating device, although by no means completely necessary.

Thus, the fundamental method of operation of this translating device has been shown. When no information pulses are applied, the material goes from plus $B_R$ to plus $B_S$ and returns to plus $B_R$; only a sneak pulse as X or $X^1$ in FIGURE 3 results across $R_L$. When a signal pulse has been received, the material moves from plus $B_R$ to minus $B_R$; an output as Y in FIGURE 3 results across $R_L$, and the material returns to plus $B_R$. Thus, the desired output signal occurs when and while the material travels within the steep middle portion of the loop where the permeability is at its greatest.

A signal translating device operating in the manner just described will be designated hereinafter as an "amplifier." It should be understood, however, that the use of the term "amplifier" is not confined to cases of actual amplification, but extended to cover all devices which produce the desired output signal in response to the application of an input signal, regardless of the fact that the power, current or voltage ratio may be greater than, equal to or less than unity. If, in contrast thereto, the desired output signal is produced in response to the non-application of an input signal, then the device will be called a "complementer."

It also should be realized that the device illustrated in FIGURE 2 as all the other devices described hereinafter operate as so-called "parallel" magnetic amplifiers or complementers. This means that the load circuit or circuits are arranged in a parallel relationship to the core when viewed from the power source, the power being supplied, in the average case, by a constant current source. The desired output signals are produced, therefore, through changes in the residual flux density which, as a rule, follow the path of the hysteresis loop and keep the core within the high permeability region, i.e., between plus and minus $B_R$.

In FIGURE 2, the load on circuit II is shown as a resistor. However, this might very well be any passive or active network including resistors, capacitors, inductors, any conceivable combination thereof, computing circuits, buffers, gates and other amplifiers.

In the wave forms illustrated in FIGURE 2*a*, the power pulse is shown occurring coincident with the end of the signal pulse. The time period $t_1$ marks the beginning of the signal pulse, $t_2$ marks the end of the signal pulse and the beginning of the power pulse, and $t_3$ marks the end of the power pulse. Actually, $t_1$, $t_2$ and $t_3$ mark the boundaries of the periods allotted to the signal and power pulses and by no means indicate the length of these pulses. The period $t_1$ to $t_2$ may be a relatively long time as, for example, one minute, and the actual signal pulse may have a duration of one microsecond. This one microsecond can occur at any time during the one minute period allotted to the signal. The power pulse, since it always occurs, is given a period equal to its duration. Its duration may be either greater or less than the actual duration of the signal pulse, and it may be applied at any time after the signal pulse. Therefore, this amplifier may also serve as a memory or a delay device. In view of the fact that the power pulse is derived from a source whose wave form can be accurately fixed, output pulses from this amplifier are of standard wave forms as determined by the power pulse source. This amplifier serves also, therefore, as a pulse former and pulse timing device.

In some instances, it may be desirable to obtain the amplifier information at some time which is not necessarily fixed. In this case, pulses applied to coil I may also be selectively controlled information pulses. Then the amplifier functions as a delayed gate. The information pulse applied to coil III selectively allows an output to occur when such output is selectively called for by an information pulse on coil I.

In FIGURE 2, the amplifier is shown with one signal input, one output and one power winding. Actually, a signal amplifier may have many signal input, output and power windings. Thus, it is possible for the amplifier to be operated by one of several sources and/or to operate several loads. These sources and/or loads can have different impedance and voltage levels and different polarities. The number of turns on the various windings would be adjusted to match the characteristics of the particular circuit.

Several input circuits will now be shown to handle the various problems which arise in operating this type of solid-state amplifier with both constant current and constant voltage sources. It should be stressed, in this connection, that the power pulse applied to coil I (the power winding) may, preferably, be taken from a constant current source.

A constant current source is theoretically a source of infinite impedance. A constant voltage source is theoretically a source of zero impedance. These definitions are idealized and are merely used to obtain a simplification in the analyses of circuits. From a practical point of view, the constant current source is a source whose impedance is comparatively high with respect to the load, and a constant voltage source is a source whose impedance is comparatively low with respect to the load.

FIGURE 4 represents a constant current input source which can be used with this type of amplifier. The portion of the core C shown corresponds to coil III of FIGURE 2. The directions of the currents, voltages, and fluxes shown are the same as those in FIGURE 2. Normally, when no signal is applied to terminal A, terminal A is at a small negative potential such that the potential on the plate of diode P is zero, and the current from the constant current source S flows through the diode P in series with A, and no current flows through coil III. In order to relax the tolerance requirements on this negative voltage, a diode Q may be inserted as shown in series with terminal $A^1$. If Q is present, the small negative voltage may be larger and diode Q will cut off. Reverse current will thereby be prevented from flowing in coil III. When an input is desired, a positive pulse is applied to terminal A; the diode P, in series with A, cuts off; and the current which formerly flowed through A now flows in coil III in the direction shown by the solid arrow. This principle is also applicable to the means for producing the power pulse. In this case, the actual power source would be the D.C. source of constant current and the source of switching pulses which cause this current to flow in coil III at the required time.

FIGURE 5 shows a constant voltage type of input in which the signal source S is theoretically an impedanceless source. The same portion of the core C as in FIGURE 4 is shown here. $Z_0$ is the internal impedance of a practical source and $Z_1$ is an impedance placed in series with the input coil III of the amplifier. The signal source S is selectively actuated to apply an input pulse. By placing a capacitor, shown dotted, across $Z_1$ a faster change in current can be obtained.

In the previous descriptions, both the signal and the power pulse were shown as square waves. In practice, many wave forms are possible. It is essential, however, that the signal pulse, if selectively applied, is present during the signal period. Whether or not this signal impulse may extend into a power pulse period, depends upon the characteristics of the other elements in the overall circuit system within which this amplifier is to be used. If the time integral of the signal voltage during the signal period is equal to or greater than $2\times10^{-8}$ $B_RAN$ volts (where A is the area of the magnetic circuit in square centimeters, $B_R$ is in gausses and N the number of turns), then full output is obtained from the amplifier. If, on the other hand, the time integral of the signal voltage is less than $2\times10^{-8}$ $B_RAN$ volts, an output proportionately smaller than the full output will be obtained. This effect may be used to make a lower power amplifier without decreasing the volume of magnetic material present. Therefore, it is not necessary, and indeed may not be desirable, that the amplifier operate with the full excursion between plus $B_R$ and minus $B_R$ as stated hereinabove.

One of the important problems connected with these amplifiers is the method of preventing power pulses from delivering energy to the signal input winding and the method of preventing the signal winding from delivering energy to the output winding. Several methods or combinations of methods can be used. One simple case occurs when the power winding is connected to a high impedance source. In this case, the high impedance itself prevents energy transfer from the signal to the power winding. Various combinations of diodes and blocking voltages can also be used on both signal and power windings.

FIGURE 6 is an example of how diodes and blocking pulses can be used to isolate the power winding from the input or the input from the power winding, whenever a constant current source is used for the input winding. (In the case of coil I (the power winding), the application of a constant current source may be regarded as a rule.) The portion of core C containing the input winding as in FIGURE 2 is redrawn in FIGURE 6. A similar arrangement may be used for the power circuit, but the diode corresponding to diode P would not be necessary in such a case, provided that the point corresponding to point S is connected to a device which prevents any back flow of current. The wave forms applied in one method of using this principle are shown in FIGURE 6*a*. The pulse applied to the power winding is shown. At the same time, a positive pulse is applied to point $A^1$ from a blocking source. This cuts off the diode Q in series with $A^1$ and prevents flow of current which, as a result of transformer action, would try to flow as shown by the dotted arrow. The blocking pulse has the same or greater duration as the power pulse and sufficient amplitude to prevent the flow of current. At some later time, as previously described, a signal pulse is applied to point A. FIGURE 6*b* shows an alternate method for accomplishing this result. Here the blocking pulse is applied to the point A and the signal to point $A^1$. In this case, the polarities of both the blocking pulse and the signal are negative.

Another method for accomplishing the same thing is shown in FIGURE 6*c*. The power pulse is the same as previously described. Now, however, a wave form as shown in the second line is applied to terminal S. This wave form is called the block and signal supply because it is of the correct polarity to block during the power pulse period, and it can supply power to the signal winding in the event that a wave form, as shown in the last line, appears at point A. Point $A^1$ would be grounded in this case, and diode P may be eliminated.

FIGURE 7 shows a method of isolating the power pulse from the input when using a constant voltage source. Here again only coil III and part of core C, as in FIGURE 2, are shown. A power pulse is applied as shown in FIGURE 7*a*. During the period of the power pulse, a blocking voltage from a low impedance source is applied at point $A^1$. This acts to cut off the diode P in series with terminal A and prevents current from flowing in the direction of the dotted arrow. This is the direction in which the power pulse would tend to make the current flow. A signal pulse as shown in the bottom wave form of FIGURE 7*a* is selectively applied at point A.

FIGURE 8 shows both D.C. power sources and blocking pulses which can be used on both power and signal windings in an amplifier. A power pulse is applied as shown at point B and the constant current from $S^1$, which normally would flow to B, is made to flow through coil I. Similarly, a blocking voltage is applied at point $A^1$. During the signal period, a positive signal pulse is applied to terminal A and the current from S, which normally would flow through A, is made to flow through coil III. A positive blocking voltage is applied at point $B^1$. Note that if a signal pulse does not occur, the block is applied anyhow so that the signal source does not have to supply power required to block. The application of the block in no way harms the operation of the amplifier.

In the preliminary description of the operation of the amplifier, the output winding was shown as a separate winding II of FIGURE 2 and other figures. However, it is not necessary that this be so. The output may be connected as shown in FIGURE 9, i.e., across the power winding I with the diode D in series with the load $R_L$. The input and output wave forms are the same as shown before. The previously discussed principles, for example, those of FIGURE 8, can be still applied to this circuit. A block such as applied at $B^1$, FIGURE 8, can also be applied at $B^1$, FIGURE 9. A power pulse can be applied at B, FIGURE 9, or if terminal B is eliminated, it can be applied at point $S^1$, as described in connection with FIGURE 6*c*. The power pulse applied at B may also serve as a blocking pulse if it is allowed to go negative, as shown in FIGURE 9*a*. In this case point $B^1$ would be grounded.

A magnetic amplifier may be constructed having only one coil on a core of ferromagnetic material. An example of a single coil magnetic amplifier is shown in FIGURE 10. This amplifier has a constant current applied via resistor $R_S$. During the power period, when the power input has a positive pulse applied thereto, diode $D_1$ cuts off and current flows through resistor $R_S$, the amplifier coil and diode $D_5$, in series, and through diode $D_4$ and the load resistor $R_L$. Assuming that there has been no signal input, the core will be at plus $B_R$ flux density, when the power pulse arrives, and will travel from plus $B_R$ to plus $B_S$, and there will be only a small voltage across $R_L$, and only a sneak output pulse will result.

During the signal input period, a negative pulse is applied to the power input. Diode $D_1$ will connect, and point A will be at the potential of the negative pulse applied to the power input. Diodes $D_4$ and $D_5$ will disconnect, and no current will flow through the amplifier coil. If a signal input is applied at this time through capacitor F, diode $D_3$ will connect, and a current will flow through the amplifier coil in the reverse direction, driving the core from plus $B_R$ flux density to minus $B_R$ flux density. Then, during the next power pulse, the core will travel from minus $B_R$ to plus $B_R$ and a large output will result.

A voltage gain may be obtained from this amplifier by connecting diode $D_3$ to point B instead of point X as shown. In this case it will require less voltage (although more current) to reset the amplifier from plus $B_R$ to minus $B_R$.

FIGURE 11 shows a method of using amplifiers of the type described in connection with FIGURES 8 to 10 for flip-flop effects. An input signal enters amplifier $A_1$ through buffer $B_1$. The signal is amplified and an output signal is obtained through buffer $B_2$. At the same time as buffer $B_2$ transmits a signal, amplifier $A_2$ receives the output from amplifier $A_1$. During the next power period, amplifier $A_2$ produces an output signal which is applied to amplifier $A_1$ through gate G and buffer $B_1$. The output of amplifier $A_2$ is buffed through $B_3$ into the output. Thus, a steady output is obtained by buffing the outputs of amplifiers $A_1$ and $A_2$. Either one of the amplifiers $A_1$ or $A_2$ is always operating, and the flip-flop is set as long as either one operates, and accordingly outputs could be taken at the output terminal of either amplifier $A_1$ or $A_2$ alone. The circulating loop must be broken, if and when it is desired to restore the flip-flop, and the gate G is provided for this purpose. If a "restore" or inhibitory signal is applied to gate G at the time that amplifier $A_2$ is delivering an output, no further output will be obtained after the output delivered by amplifier $A_2$ has disappeared, and the flip-flop will have been restored. If, however, gate G is located at the input to amplifier $A_2$ and the "restore" or inhibitory signal is applied when amplifier $A_2$ is delivering an output, the inhibition must last until amplifier $A_1$ has delivered its output, and the flip-flop will restore only after amplifier $A_1$ has completed its output. In order that the flip-flop might be restored as rapidly as possible, an inhibitory gate operated by the restore pulse could also be placed on the output line. For fastest operation, it would be desirable to have a restore gate at the input to amplifier $A_1$, the input to amplifier $A_2$ and the output.

FIGURES 11*a* and 11*b* show a schematic diagram of this flip-flop arrangement and the applied power waves and blocking pulses, respectively.

As shown in FIGURES 11*a* and 11*b*, the two amplifiers $A_1$ and $A_2$ are controlled from a pair of phase opposed power pulses $PP_1$ and $PP_2$. The output of amplifier $A_1$ is buffed through diode $D_4$ to the input winding of amplifier $A_2$, and through diode $D_7$ to the output load $R_L$. The output of amplifier $A_2$ is also buffed through diode $D_8$ to the output load $R_L$, and through feed back line F to the cathode of diode $D_9$ in the inhibit gate G.

In operation, when the flip-flop has been restored, neither magnetic amplifier $A_1$ or $A_2$ produces an output signal and the voltage across the output load $R_L$ is low. Application of a positive set signal to the set terminal (anode of diode $D_3$) causes amplifier $A_1$ to switch from positive remanence $+B_R$ to negative remanence $-B_R$ as previously described. The next power pulses ($PP_1$) applied via diode $D_1$ to magnetic amplifier $A_1$ causes that amplifier to experience a flux change as the magnetic core thereof is switched now from negative remnence $-B_R$ to positive $+B_R$. As a consequence of this change in flux the magnetic amplifier $A_1$ produces a positive output voltage pulse (across its upper winding) which is applied via diode $D_4$ to the input winding of magnetic amplifier $A_2$ and via diode $D_7$ to the common output line connected to load $R_L$. In response to a voltage pulse applied at its input winding amplifier $A_2$ will also produce a positive output voltage pulse when the positive portion of the power pulse ($PP_2$ FIGURE 11*b*) is applied thereto. The positive output pulse produced by amplifier $A_2$ is developed across load $R_L$ and is applied via line F to the cathode of diode $D_9$ in inhibit gate G. This positive pulse is transmitted through gate G (assuming a negative restore pulse is not applied to gate G at diode $D_{10}$), to the input winding of amplifier $A_1$, where this pulse, in a manner similar to the set pulse applied at diode $D_3$, causes amplifier $A_1$ to produce another output pulse. Thus, a continuous flow of output pulses will be circulted through the ring comprising amplifier $A_1$, amplifier $A_2$ and gate G. However, when a negative restore pulse is applied to gate G at the cathode of diode $D_{10}$, any positive output pulse applied to the input of gate G, at diode $D_9$, will be inhibited; that is, will not be transmitted therethrough. Therefore, the application of the restore pulse stops the recirculation of pulses through the ring just described and the flip-flop will be in the restored condition again.

The circuit illustrated in the block diagram of FIGURE 11*c* and the schematic diagram of FIGURE 11*d* differs in substance from the circuit of FIGURES 11 and 11*a* insofar as only one amplifier is employed. Circuit elements of FIGURE 11*d* having the same function as circuit elements of FIGURE 11*a* bear the same identifying number. Here any well-known pulse delay device may be used to delay an output pulse from the single amplifier for the period of the power pulse applied to this amplifier. At the end of the delay period, the output from the delay device is buffed into the output line and also placed on the input to the amplifier. Thus, steady output is obtained following the application of an input or set signal, and this output is continued until a restore signal is applied to gate G to inhibit the output from the delay device from reaching the input to the amplifier.

Again, in this embodiment of the invention, the output of amplifier $A_1$ and delay element D need not be buffed together since the output of either of the elements alone would indicate the state of the flip-flop.

Note should be taken that, in addition to the substitution of delay element D for amplifier $A_2$, other small differences exist between FIGURE 11*d* and FIGURE 11*a*. To be sure, these changes are of the design type. For example, in FIGURE 11*d* the polarity of diode $D_{10}$ has been reversed but so has the polarity of the restore pulse applied thereto. With the exception of delay element D, these two circuits are substantially electrically and logically identical.

Two other circuits may be used for flip-flop effects, as shown in FIGURES 11*e* and 11*g*. The wave forms at the various points in these circuits are shown in FIGURES 11*f* and 11*h*, respectively. Both of these circuits will allow the flip-flops to be set or restored with a single pulse that may occur during the signal period for either amplifier.

FIGURE 11*e* illustrates a flip-flop comprising two three-winding amplifiers $A_{10}$ and $A_{11}$, with the set signal applied to both inputs thereof in parallel.

In FIGURE 11*e* the convention used in FIGURE 8 will follow, that is, power pulses are applied to power pulse windings I, positive signal pulses are applied to input windings III, and outputs are developed across output windings II as the core of the particular amplifier involved traverses its hysteresis loop. It will be observed from FIGURES 11*e* and 11*f* (first two lines) that two sets ($PP_1$ and $PP_2$) of oppositely phased power pulses are employed; power pulse $PP_1$ being applied to winding I of amplifier $A_{10}$ via diode $D_{11}$, and power pulse $PP_2$ being applied to winding I of amplifier $A_{11}$ via diode $D_{12}$. An output from winding II of amplifier $A_{10}$ is coupled via diode $D_5$ to a common feedback line $F_{10}$ as well as to load $R_L$. In a similar manner, an output from amplifier $A_{11}$ is coupled to the same feedback line $F_{10}$ and load $R_L$ via diode $D_6$. Feedback line $F_{10}$ connects the outputs of amplifier $A_{10}$ and $A_{11}$ back to the respective input circuits; that is, via diodes $D_2$ and $D_3$ to one end of winding III of amplifier $A_{10}$ and via diodes $D_2$ and $D_4$ to a similar end of winding III of amplifier $A_{11}$. Diode $D_1$ which is connected to the anodes of diodes $D_3$ and $D_4$ couples the selectively applied set signal (FIGURE 11*f*, fifth line) to the same end of both aforesaid input windings III. The selectively applied restore pulse is coupled via diodes $D_7$ and $D_8$ to the remaining end of input windings III of amplifiers $A_{10}$ and $A_{11}$, respectively. Blocking pulses 1 and 2 which are oppositely phased (see FIGURE 11*f*, lines 3 and 4) function, as previously stated, to prevent current flow in the input windings III of an amplifier when the power pulses are applied to the power pulse windings I thereof. Blocking pulses 1 and 2 are coupled to the lower ends of windings III of amplifiers $A_{10}$ and $A_{11}$ via diodes $D_9$ and $D_{10}$, respectively.

In operation, one or the other of the blocking pulses 1 or 2 will always be at zero potential (FIGURE 11*f*). A selectively applied set input signal will always appear during the signal period of one or the other of the amplifiers $A_{10}$ or $A_{11}$. The particular amplifier receiving a set signal during its signal period will produce an output simultaneously with the arrival of the next positive power pulse applied thereto. This output signal is returned to the common input through diode $D_2$ and will continue to set the alternate amplifiers $A_{10}$ or $A_{11}$ with every such pulse. Thus, a continuous output signal is produced from this flip-flop after having received a set signal.

For example, a single set signal applied when the power pulse $PP_1$ is positive; power pulse $PP_2$ is negative; blocking pulse 1 is positive; and blocking pulse 2 is at zero potential (a condition which will exist simultaneously—see FIGURE 11*f*) will cause amplifier $A_{11}$ to produce a positive output signal across winding II thereof in synchronism with the next positive portion of power pulse $PP_2$. This output signal is buffed back to the input windings III of amplifiers $A_{10}$ and $A_{11}$ via line $F_{10}$, diode $D_2$, diode $D_3$, and Diode $D_4$. The regenerated signal arrives at a time when power pulse $PP_1$ is negative; power pulse $PP_2$ is positive; blocking pulse 1 is at zero potential; and blocking pulse 2 is positive. Accordingly, amplifier $A_{10}$, in the mode of operation already described, will be affected by this regenerated input pulse and in synchronism with the next positive portion of power pulse $PP_1$ produces a positive output signal across its output windings II. This positive output signal is fed back to the inputs of amplifiers $A_{10}$ and $A_{11}$ as previously described, and consequently thereafter these amplifiers will produce positive output signals across their respective output windings II, in alternation.

In order to stop the endless recirculation of signals, that is, to change the state of this flip-flop, a restore signal is applied to signal windings III of amplifiers $A_{10}$ and $A_{11}$ simultaneously via diodes $D_7$ and $D_8$. The restore signal is a positive pulse (see FIGURE 11*f*, line 6) and serves to prevent current from flowing in either signal windings III of amplifiers $A_{10}$ or $A_{11}$ much in the same way as the blocking pulses 1 and 2 previously described. The restore signal which is selectively applied will appear when either amplifier $A_{10}$ or $A_{11}$ is feeding back a positive signal to one end of the windings III. It will be observed that the positive restore signal is applied to the other ends of windings III in each of the amplifiers $A_{10}$ or $A_{11}$, and accordingly will inhibit the effect of the positive feedback signal to said windings III by making the ends thereof have a same potential, or by blocking diodes $D_3$ and $D_4$ depending on the magnitude of the restore signal.

FIGURE 11*g* shows basically the same arrangement as FIGURE 11*e*, but for a center tapped transformer T which is to apply the blocking pulses to both amplifiers from a single supply source. The transformer has a voltage of 2E volts peak to peak, and since the center tap of the transformer is returned to 0 volt, the blocking voltage applied to each amplifier is plus E. The restoring voltage is applied to the center tap of the transformer and thus blocks both input circuits.

The wave forms for this flip-flop are shown in FIGURE 11*h*. Its operation is the same as that described for the flip-flop of FIGURE 11*g* with the exception of the manner of applying the blocking pulses, and hence will not be described again. Suffice it to say, in regard to the blocking pulses, that the transformer shown in the center of FIGURE 11*g* applies a pulse in alternation to each of the signal windings III of amplifiers $A_{10}$ and $A_{11}$ which prevents the passage of current therethrough when the amplifier concerned receives the positive portion of the power pulse at its winding I.

Having thus described our invention, we claim:

1. In combination, first and second magnetic amplifiers, each said magnetic amplifier having an input and an output, first and second signal sources, and an inhibitory gate having an output and at least one input, wherein said first signal source is connected to the input of said first amplifier, the output of said first amplifier is connected to the input of said second amplifier, and the output of said second amplifier is connected to the input of said first amplifier, said gate is connected between the input of one of said amplifiers and the output of the other of said amplifiers, and said second signal source is connected to said gate for supplying signals to inhibit said gate.

2. The combination according to claim 1 further comprising a buffer circuit interposed between the input of said first amplifier and the outputs of said first signal source and said inhibitory gate.

3. The combination according to claim 1 further comprising a common output line, a buffing circuit interposed between the outputs of said first and second amplifiers and said output line, and a connection between said output line and the input of said inhibitory gate for coupling the outputs of said amplifiers to said inhibitory gate.

4. The combination according to claim 1 further comprising means coupled to said first and second amplifiers for rendering said amplifiers operative in alternation.

5. The combination defined in claim 1 further comprising means coupled to said amplifiers supplying power pulses to said first amplifier and said second amplifier in alternation.

6. In combination, first and second magnetic amplifiers, each said magnetic amplifier having an input and an output, first and second signal sources, and an inhibitory gate having an output and at least one input, wherein said first signal source is connected to the input of said first amplifier, the output of said first amplifier is connected to the input of said second amplifier, and the output of said second amplifier is connected to the input of said first amplifier, said gate is connected between the input connection of said first amplifier and the output connection of said second amplifier, and said second signal source is connected to said gate for supplying signals to inhibit said gate.

7. In combination, a magnetic amplifier having an input and an output, first and second signal sources, a signal delaying device having an input and an output, and an inhibitory gate having an output and at least two inputs, one being an inhibitory input, wherein said first signal source is coupled to the input of said amplifier, the output of said amplifier is connected to the input of said delaying device, the output of said delaying device is connected to an input of said gate, the output of said gate is connected to the input of said amplifier, and said second signal source is connected to said inhibitory input to prevent signals from passing through said gate when signals from said second signal source are present.

8. A bistable device comprising a pulse-type parallel magnetic amplifier responsive to power pulses during one interval of time and signal pulses during another interval of time, said amplifier having an input, an output, and a magnetic core with a winding means thereon adapted to receive signal pulses, a source of power pulses connected to a portion of said winding means for developing output signals across said portion of said winding means after the application of a signal pulse to said amplifier, first and second signal sources, a signal delaying device having an input and an output and an inhibiting gate having at least two inputs, one being an inhibitory input and an output, wherein said winding means, said gate and delaying device are connected in a ring, said first signal source is connected to one of said elements in the ring for injecting a signal into said ring for circulation therein and said second signal source is connected to said inhibitory input of said gate for supplying signals to inhibit said gate and to stop the circulation of signals from said first source in said ring.

9. A bistable device comprising a pulse-type parallel magnetic amplifier responsive to power pulses during one interval of time and signal pulses during another interval of time, said amplifier having an input, an output, and a magnetic core with a winding means thereon adapted to receive signal pulses and power pulses, said power pulses producing an output across a portion of said winding means after the application of a signal pulse to said amplifier, first and second signal sources, a signal delaying device having an input and an output and an inhibiting gate having at least two inputs, one being an inhibitory input and an output wherein said winding means, said gate and delaying device are connected in a ring, said first signal source is connected to one of said elements in the ring for injecting a signal into said ring for circulation therein and said second signal source is connected to said inhibitory input of said gate for supplying signals to inhibit said gate and to stop the circulation of signals from said first source in said ring.

10. In combination, a magnetic amplifier having an input and an output, first and second signal sources, a signal delaying device having an input and an output, and an inhibitory gate having an output and at least two inputs, one being an inhibitory input, wherein said amplifier, said gate and delaying device are connected in a ring, said first signal source is connected to one of the aforesaid elements in the ring for injecting a signal for circulation in said ring and said second source is connected to said inhibitory input of said gate for supplying signals to inhibit said gate and to stop the circulation of signals from said first source in said ring.

11. A flip-flop comprising first and second magnetic amplifiers, each amplifier including a magnetic core member and an input and an output winding inductively coupled to said core member wherein the input winding of said first amplifier is adapted to receive a selectively applied signal from a first signal source and the output winding of said first magnetic amplifier is coupled to the input winding of said second magnetic amplifier, an inhibitory gate interposed between the output winding of said second magnetic amplifier and the input winding of said first magnetic amplifier wherein said inhibitory gate is adapted to receive a selectively applied signal from a second source which prohibits the passage of an output signal from said second magnetic amplifier to said first magnetic amplifier.

12. The combination according to claim 11 comprising means coupled to the windings of said magnetic amplifiers for rendering said amplifiers operative in alternation.

13. The combination according to claim 11 comprising means coupled to the windings of said magnetic amplifiers for supplying power pulses to said amplifiers in alternation.

14. The combination according to claim 11 further comprising a unilateral conductor interposed between the output winding of said first magnetic amplifier and the input winding of said second magnetic amplifier.

15. A flip flop circuit comprising first and second magnetic amplifiers, said first magnetic amplifier including a first magnetic core member and a first winding means inductively coupled thereto, said second magnetic amplifier including a second magnetic core member and a second winding means inductively coupled thereto, each said winding means having at least one terminal for receiving an input signal and for transmitting an output signal, wherein the terminal of said first winding for transmitting an output signal is coupled to the terminal of said second winding for receiving an input signal, an inhibitory gate interposed between the terminal of said second winding for transmitting an output signal and the terminal of said first winding for receiving an input signal, said last mentioned terminal being adapted to receive a selectively applied signal from a first signal source, and said inhibitory gate is adapted to receive a selectively applied signal from a second signal source which prohibits the passage of an output signal from said second magnetic amplifier to said first magnetic amplifier.

16. The combination according to claim 11 comprising means coupled to the output winding means of said magnetic amplifier for rendering said amplifiers operative in alternation.

17. The combination according to claim 11 comprising means coupled to the output winding means of said magnetic amplifiers for supplying power pulses to said amplifiers in alternation.

18. The combination according to claim 15 further comprising a unilateral conductor interposed between the winding means of said amplifiers.

19. The combination according to claim 16 wherein a pulse developed across said first winding means when said first magnetic amplifier is rendered operative is applied to said second winding means.

20. The combination according to claim 16 wherein a pulse developed across said first winding means is applied to said second winding means.

21. A flip flop circuit comprising first and second magnetic amplifiers, said first magnetic amplifier including a first magnetic core member and a first winding means inductively coupled thereto, said second magnetic amplifier including a second magnetic core member and a second winding means inductively coupled thereto, said first winding means having a first terminal for receiving an input signal and a second terminal for transmitting an output signal, said second winding means having a third terminal for receiving an input signal and a fourth terminal for transmitting an output signal wherein the second terminal of said first winding means is coupled to the third terminal of said second winding means, and an inhibitory gate interposed between the fourth terminal of said second winding means and the first terminal of said first winding means, said first terminal being adapted to receive a selectively applied signal from a first signal source and said inhibitory gate being adapted to receive a selectively applied signal from a second signal source which prohibits the passage of an output signal from said second magnetic amplifier to said first magnetic amplifier.

22. The combination according to claim 21 comprising means coupled to said second and fourth terminals for rendering said amplifiers operative in alternation.

23. The combination according to claim 21 comprising means coupled to said second and fourth terminals for supplying power pulses to said amplifiers in alternation.

24. The combination according to claim 23 further including a unilateral conductor interposed between said second and third terminals.

References Cited in the file of this patent

UNITED STATES PATENTS

| | | |
|---|---|---|
| 2,574,438 | Rossi | Nov. 6, 1951 |
| 2,652,501 | Wilson | Sept. 15, 1953 |
| 2,697,178 | Isborn | Dec. 14, 1954 |
| 2,709,225 | Pressman | May 24, 1955 |